No. 880,257. PATENTED FEB. 25, 1908.
L. C. WELCH.
SHOCK ABSORBING DEVICE FOR VEHICLES.
APPLICATION FILED AUG. 9, 1907.
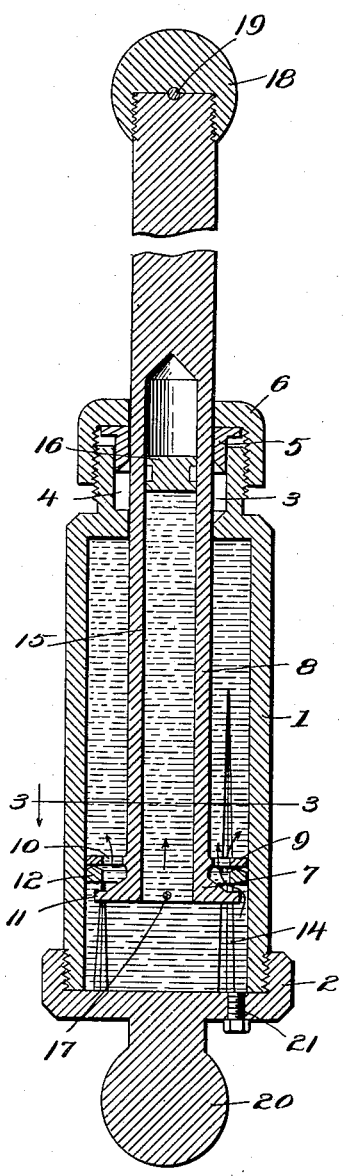
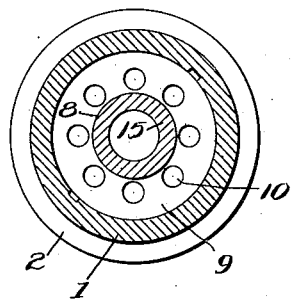
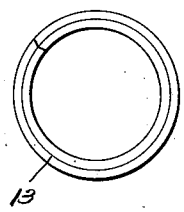
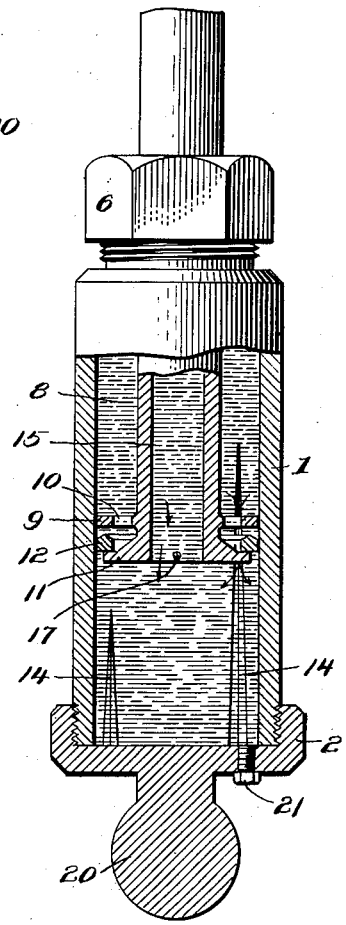
Witnesses
F. C. Gibson.
C. Bradway.
Inventor
Lewis C. Welch.
By Victor J. Evans
Attorney

UNITED STATES PATENT OFFICE.

LEWIS C. WELCH, OF OAKLAND, MAINE.

SHOCK-ABSORBING DEVICE FOR VEHICLES.

No. 880,257.　　　Specification of Letters Patent.　　　Patented Feb. 25, 1908.

Application filed August 9, 1907. Serial No. 387,886.

*To all whom it may concern:*

Be it known that I, LEWIS C. WELCH, a citizen of the United States, residing at Oakland, in the county of Kennebec and State of Maine, have invented new and useful Improvements in Shock-Absorbing Devices for Vehicles, of which the following is a specification.

This invention relates to shock absorbing devices intended for self-propelled or other vehicles, whereby the disagreeable jolting of the vehicle body when passing over inequalities in the roadbed will be eliminated without, however, destroying the resiliency of the body supporting springs.

The invention has for one of its objects to improve and simplify the construction and operation of devices of this character so as to be comparatively easy and inexpensive to manufacture, thoroughly reliable and efficient in use, and composed of few parts.

A further object of the invention is the provision of a shock absorber comprising a hydraulic cylinder containing a piston which is provided with valve controlled ports whereby the piston can be freely moved in one direction while retarded in the other, there being by-passes in the wall of the cylinder for permitting liquid to pass by the piston during the movement for checking the recoil of the body supporting springs.

A further object of the invention is the provision of a shock absorber of the type referred to that is provided with a hollow piston rod containing a floating piston on one side of which is an air cushion that serves to cushion the shocks and insure easy movement.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one of the embodiments of the invention, Figure 1 is a vertical longitudinal section of the shock absorber showing the parts in the position occupied when the body supporting springs of the vehicle are compressed. Fig. 2 is a partial section in side elevation of the device showing the parts in the position occupied during the re-coil or expansion of the body supporting springs. Fig. 3 is a transverse section on line 3—3, Fig. 1. Fig. 4 is a plan view of the valves controlling the ports of the piston.

Similar reference characters are employed to designate corresponding parts throughout the several views.

Referring to the drawing, 1 designates the cylinder of the device that is internally bored, and on the lower end thereof is threaded a cap 2 for closing the same, and the opposite end of the cylinder is provided with a stuffing box 3 that contains a packing 4 that is compressed by a gland 5, there being a cap nut 6 for pressing the gland inwardly. In the cylinder is a piston designated generally by 7 that is formed on a rod 8 which passes outwardly through the stuffing box. The piston consists of an upper flange 9 that has a working fit with the cylinder and is provided with a plurality of ports 10 for permitting oil or other liquid to pass from one side of the piston to the other. Spaced from the flange 9 is a second flange 11 that is of smaller diameter than the cylinder so as to form an annular space for permitting the liquid to pass, and this space is of the same area as the combined areas of the ports 10, the top side of the flange 11 forming a seat for an annular valve 12. The top side of the valve 12 is formed with a ridge 13 which contacts with the bottom side of the flange 9 when the valve is fully open and by this construction, the valve will not adhere to the said flange, but freely close under the upward movement of the piston. The movement of the valve is comparatively small so that it is extremely sensitive to changes in movement of the piston, thereby causing a rapid action. In the internal surface of the cylinder 1 are vertically extending tapering grooves 14 which are of different lengths and taper in an upward direction and these grooves form by-passes around the piston which cause a varying resistance to the flow of liquid around the piston when the valve 12 is seated. The piston rod 8 is hollow for a suitable length and open at its lower end, and having a working fit in this bore 15 is a floating piston 16 that is retained in the piston rod by a cross bar 17 at the open end of the bore, the space on the upper side of the piston forming an air pocket or cushion, while the bore at the under side of the piston is in free communication with the cylinder.

The piston rod is of suitable length and at its free end is a spherical enlargement or ball 18 that is preferably threaded thereon and retained in position by a pin 19 passing through the ball and engaging in a groove in the end of the piston rod. The lower end of the device is provided with a spherical enlargement or ball 20 that is formed on the cap 2. These enlargements are adapted to engage in socketed members attached respectively to the seats for the body springs or other suitable part of the vehicle that is fixed with respect to the axle and to the vehicle body so that the relative movement of the running gears and body will bring the shock absorbing device into play, and these ball and socket joints permit of relative oscillating movement between the running gears and body in a horizontal direction both longitudinally and transversely.

In practice, after the cylinder has been filled with oil or any other suitable hydraulic medium through the normally plugged filling opening 21 in the cap 2, the device is applied to the vehicle so that the cap end thereof will be lowermost. When an obstruction in the roadway is met, the body supporting springs are compressed and the piston is forced downwardly in the cylinder 1, thereby causing the liquid on the bottom side of the piston to raise the valve 12 and permit the liquid to move to the top side of the piston. The air cushion above the piston 16 permits more oil to enter the hollow of the piston rod to compensate for the oil displaced by the piston rod as it is moved into the cylinder. The air cushion imparts resiliency to the downward movement and by compensating for the displaced oil, it reduces the inward pressure so that there will be no shocks transmitted through the device. During the recoil of the body supporting springs, the movement is checked solely by the hydraulic means which thus insures a uniform action at all times. The re-coil is checked with decreasing speed to allow, as far as practicable, the drop of the axle as an obstruction is passed over and also to prevent the holding of the body supporting springs compressed too long which would be objectionable for the reason that severe jolting would be caused in case two or more obstructions in the road were passed over in quick succession. During the re-coil movement, the valve 12 will be immediately seated and the oil on the top side of the piston and in the hollow of the piston rod will pass to the bottom side of the piston as indicated by the arrows in Fig. 2, the freedom of the passage of the liquid oil becoming less and less toward the upper limit of the movement of the piston, since the by-pass grooves 14 become more and more restricted.

In case of a very sudden compression of the body supporting springs, as in passing over obstructions at a high rate of speed, the resistance of the device will not be materially increased owing to the fact that the movement of the piston will cause more oil to be displaced than can pass through the piston ports, and this oil thus displaced will be forced into the bore of the rod and against the air cushion, while a momentary vacuum will be produced above the piston. By the compression of the body supporting springs at a moderate rate of speed, the resistance of the device will not be materially increased since the slightly increasing internal pressure due to the air being compressed by the oil by the displacement of the piston rod as it enters the cylinder, will be offset by the increasing number and size of the tapering grooves in the wall of the cylinder, thereby lessening the resistance below the piston.

In a construction of the character referred to, the valve arrangement is compact and the action positive and comparatively little motion of the piston or cylinder is required to open or close the valve, thereby rendering the device sensitive so that failure to operate is avoided. Furthermore, the device is composed of few parts of simple construction and so designed that the liability to derangement is reduced to a minimum.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrated and that such changes may be made when desired, as are within the scope of the claims.

Having thus described the invention, what I claim is—

1. In a shock absorber for vehicles, the combination of a cylinder, a piston therein, by-passes extending from one side to the other of the piston and designed to vary the resistance to the passage of liquid as the position of the piston changes, and a pneumatic cushioning device associated with the piston for assisting in absorbing the shocks.

2. In a shock absorbing device for vehicles, the combination of a cylinder provided with longitudinally extending grooves of diminishing cross section from one end to the other, a piston in the cylinder adapted to move back and forth in the grooved portion of the cylinder, ports in the piston, a valve arranged to permit a free flow of liquid through the ports when the piston moves in one direction and positively interrupts the flow when the piston moves in the opposite direction, and a pneumatic cushioning device associated with the piston for assisting in absorbing the shocks.

3. In a shock absorbing device for vehicles, the combination of a cylinder provided with longitudinally extending grooves of diminishing cross section from one end toward the other, a piston in the cylinder adapted to move back and forth in the grooved portion of the cylinder, ports in the piston, a valve arranged to permit a free flow of liquid through the ports when the piston moves in one direction and positively interrupts the flow when the piston moves in the opposite direction, a hollow piston rod communicating with the cylinder, and pneumatic cushioning means in the rod.

4. In a shock absorbing device for vehicles, the combination of a cylinder, a piston therein provided with spaced flanges of different diameters, the flange of larger diameter having a working fit with the cylinder, and ports in the said larger flange, a valve arranged to close the space between the smaller flange and cylinder as the piston moves in one direction, and a plurality of by-passes of different lengths and resistances connecting points on opposite sides of the piston.

5. In a shock absorbing device for vehicles, the combination of a cylinder, a piston therein comprising a pair of spaced flanges of different diameters and arranged in fixed relation, the flange of larger diameter having contact with the cylinder, ports in the larger flange, and an annular valve disposed between the flanges for interrupting the flow of liquid through the ports when the piston moves in one direction, said valve being bodily removable and retained between the flanges and carried back and forth with the piston by the flanges.

6. In a shock absorbing device for vehicles, the combination of a cylinder, a piston therein comprising a pair of spaced flanges of different diameters, the flange of larger diameter having contact with the cylinder, ports in the larger flange, an annular valve adapted to seat on the flange of smaller diameter for closing the space between the periphery of the latter and internal surface of the cylinder, said valve being free to move between the two flanges.

7. In a shock absorbing device for vehicles, the combination of a cylinder, a piston therein provided with spaced flanges of different diameters, ports in the larger flange, an annular valve disposed between the flanges and adapted to be seated and unseated by the initial part of each stroke of the piston for controlling the flow through the ports, a hollow piston rod connected with the piston and communicating with the cylinder, and a floating piston in the rod and confining a body of elastic fluid in the latter.

8. In a shock absorbing device, the combination of a cylinder provided with longitudinally extending internal grooves of different lengths tapering in the same direction, a piston comprising a pair of spaced flanges of different diameters and having a flange of larger diameter in contact with the cylinder, an annular valve disposed between the flanges and of an external diameter equal to the internal diameter of the cylinder, a hollow piston rod extending into the cylinder and closed at one end and having its open end communicating with the cylinder, a floating valve in the hollow of the rod and confining a body of elastic fluid therein, and a stop at the open end of the rod for retaining the floating piston therein.

9. In a shock absorbing device for vehicles, the combination of a cylinder open at one end and provided with a head at the opposite end having an opening, a piston in the cylinder inserted and removed through the open end of the latter, a piston rod integrally connected with the piston and extending through the opening in the head of the cylinder and removable through the open end of the latter, a stuffing box on the headed end of the cylinder for the piston rod, a cap for the open end of the cylinder, a ball on the cap, and a ball removably mounted on the free end of the piston rod to permit the rod to be inserted through the stuffing-box.

In testimony whereof I affix my signature in presence of two witnesses.

LEWIS C. WELCH.

Witnesses:
FRED HALLETT,
FRANK S. GARLAND.